United States Patent Office 3,076,350
Patented Feb. 5, 1963

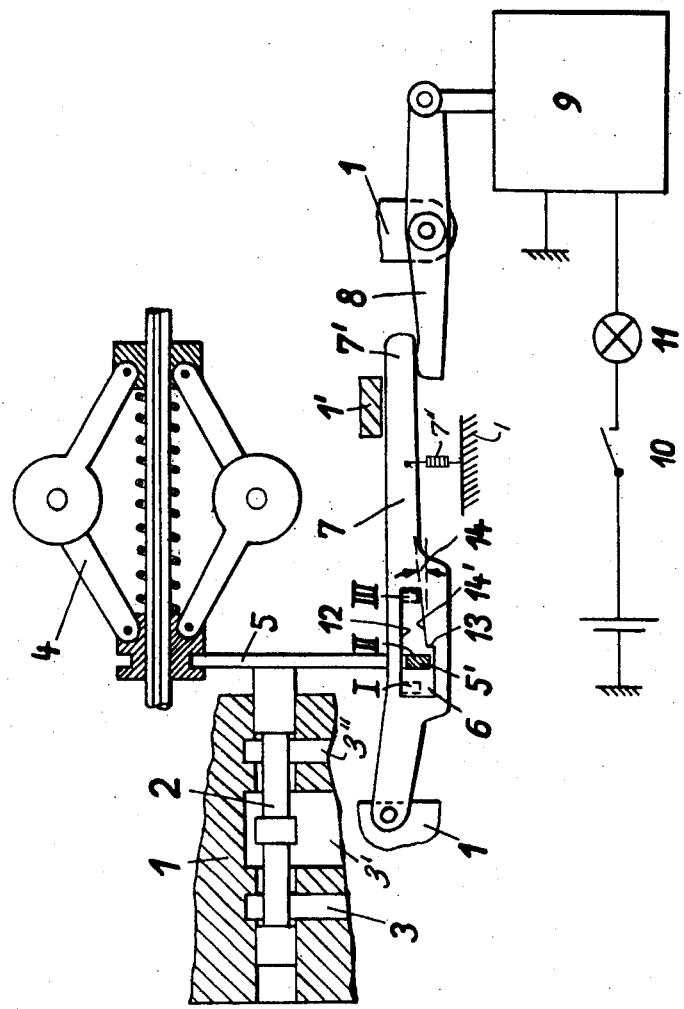

3,076,350
SHIFTING CONTROL ARRANGEMENT FOR CHANGE-SPEED GEARS
Rudolf Boguslawski, Munich, Germany, assignor to Bayerische Motoren Werke A.G., Munich, Germany
Filed Sept. 19, 1960, Ser. No. 57,049
19 Claims. (Cl. 74—336.5)

The present invention relates to an installation for selectively limiting the shifting operation as regards the speeds or discrete transmission ratios in automatically shifted motor vehicle change-speed transmissions in which there is actuated an adjusting or control member, preferably dependent on the rotational speed or the pressure such as supplied by a pump driven, for instance, by the input and/or output shaft of the transmission, which controls the shifting operation for the transmission ratios or speeds of the change-speed transmission.

Such installations are necessary with automatically-shifted motor vehicle change-speed transmissions for various driving conditions in order to exclude or lock-out one or several transmission ratios or speeds from the automatic shifting operation or to preclude the automatic engagement of one or several predetermined speeds or transmission ratios since, for example, while driving in the city or through mountainous terrain, it is appropriate to block or lock-out the highest speed or transmission ratio in order to enable driving of the vehicle at all times within the range of the transmission ratios or speeds producing a relatively large driving torque at the driven wheels.

In one known installation of the prior art of the type described hereinabove, an additional, selectively adjustable sleeve is arranged concentrically to a selector control slide valve member automatically controlled by a centrifugal governor the displacement of which is influenced also by the engine load, as expressed, for instance, by the position of the gas pedal, which sleeve is provided with flow-apertures arranged correspondingly to the apertures in the control cylinder housing the control slide valve member. By the displacement of the sleeve, a part of the apertures within this control cylinder which are coordinated to the individual speeds or transmission ratios may be closed off and the communication to the aperture of the selector slide valve member is blocked or closed off thereby. The automatic shifting into the highest speed or transmission ratio or into several of the upper speeds or transmission ratios is prevented thereby. If, however, in this prior art construction, the supply of the shifting medium is blocked or closed off for a transmission ratio or speed presently engaged, then this transmission ratio or speed is disengaged instantaneously, and the change-speed transmission is shifted back at that moment to the highest transmission ratio or speed which is not blocked or locked out. In addition to the relatively expensive construction of this prior art installation requiring several accurately fitted and mutually sealing parts, there arises with such an arrangement the further disadvantage that for purposes of avoiding damages and shocks, the control sleeve limiting the transmission shifting operation can be displaced only, for purposes of blocking or lock-out, if no speed or transmission ratio is engaged at the time of the lock-out operation which would be locked out thereby.

The present invention is based on the recognition of these inadequancies of the prior art constructions and on the aim to avoid the disadvantages of this known installation as well as to produce an installation for selectively limiting the change-speed transmission shifting operation with simple means so that the latter may possibly be installed also subsequently into existing change-speed transmissions without any great difficulties and without modifications in the existing construction.

The present invention essentially consists in the cooperation of a lock-out or blocking member with a control member or with an adjusting member which lock-out member at least has two shifting positions, and which, in one of the positions thereof, enables the unimpeded movement of the control member or adjusting member whereas, in the other position thereof, the movements of these parts are limited to a predetermined range. The lock-out or blocking member may thereby be constructed in such a manner that it permits the movements of the control member or adjusting member from a position thereof within the locked-out range into the open or free range thereof.

It is possible by such a construction of the lock-out or blocking member to actuate the transmission ratio or speed limiting means also during driving conditions in which the control member or adjusting member is disposed within the range to be locked out or blocked. However, with certain change-speed gear constructions it may also be desirable to construct the blocking or lock-out member in such a manner that in the blocking or lock-out position thereof, the speed or transmission ratio shifting operation remains limited, on the one hand, to a predetermined partial range and, on the other, during actuation of the blocking or lock-out member at a given instant or moment during which the control member or adjusting member is disposed within the range to be blocked or locked-out, to retain the control member or adjusting member in this position. Such an arrangement, for example, provides the possibility, with an automatically shifting change-speed transmission for motor vehicles in which a direct speed is provided as the highest speed, to maintain this direct speed or direct transmission ratio with the same installation which, on the other, is adapted to limit the speed or transmission-ratio shifting operation to the lower speeds or transmission ratios in which the vehicle is driven with a speed-reduction, for example, through a hydraulic torque converter.

According to a further feature of the present invention, the lock-out member may be constructed as a drop pawl or dog which is provided with a cut-out portion or aperture into which engages a part operatively connected with the control member or adjusting member. The cut-out portion of the pawl or dog is constructed with a length corresponding to the movement of the aforementioned connecting part and with a width which is larger than the connecting part at least by the shifting path of the pawl or dog. Furthermore, the cut-out portion is reduced approximately to the width of the connecting part over a portion of the length thereof by means of a shoulder. The boundary line of the cut-out portion for the pawl or dog member thereby extends from the shoulder, within the reduced or narrowed region of the cut-out portion, at a slight angle to the longitudinal dimension of the cut-out portion which constantly decreases the width thereof within this narrowed region. It is possible by the provision of this angle that the part operatively connected with the control member or adjusting member may slide out of the blocked or locked out range of the cut-out portion into the open or free range thereof with the pawl or dog member in the blocking or lock-out position thereof whereby the installation is adapted to be actuated without regard to the engaged speed or transmission ratio.

It is additionally proposed in accordance with the present invention, for purposes of installation of the arrangement of the present invention into the housing of an already existing, automatically-shifted motor vehicle change-speed transmission, to pivotally connect the pawl or dog member with one end thereof at the transmission housing and to actuate the same at the other free end thereof by means of a shifting member adapted to be controlled or influenced by the driver which shifting member is adapted to displace the pawl or dog member into the different shifting positions thereof. The free end of the drop-out pawl or dog member may be actuated by means of an electromagnet into a blocking or lock-out position determined by means of an abutment whereby the energizing circuit of the electromagnet is adapted to be closed by means of a switch controlled by the driver, and this position of the switch is indicated to the driver, for example, by a warning light in the energizing circuit. The rest position of the pawl or dog member reached by gravitational force may be determined by abutment at the connecting part of the side of the cut-out portion which extends rectilinearly and limits the width thereof whereby the electromagnet may also be retained in the rest position by a suitable spring force of known construction.

Accordingly, it is an object of the present invention to provide a selective control mechanism for limiting the transmission ratios or speeds that are adapted to be engaged in an automatically shifted change-speed transmission which obviates the disadvantages and shortcomings of the prior art construction.

Another object of the present invention resides in the provision of a selectively operable control system, adapted to be operated at the will of the driver which makes possible to lock-out at least one speed in an automatically-shifted change-speed transmission and which may be operated without regard to the particular speed engaged at the time in the transmission.

Still another object of the present invention resides in the provision of a simple, effective and relatively inexpensive control installation which operates reliably to lock-out at least one speed or transmission ratios of an automatically-shifted, motor vehicle change-speed transmission so as to assure operation thereof within a range providing sufficient driving torque at the driven wheels.

Another object of the present invention resides in the provision of a control system of the type described hereinabove which may be readily used with any automatically shifted change-speed transmission to preclude the engagement of at least one speed thereof by reason of its relatively inexpensive construction, which does not require any accurate fitting of the parts and additionally obviates the need for seals and the like in connection with hydraulically actuated automatic control systems.

Still a further object of the present invention resides in the provision of a control system operative to lock-out the automatic engagement of at least one speed of an automatically shifted change-speed transmission which is simple in construction and may be readily installed also into existing change-speed transmissions of any type.

These and other objects, features and advantages of the present invention will become more obvious from the following description when taken in connection with the accompanying drawing which shows in the single figure thereof, for purposes of illustration only, a schematic view, partly in cross section of a control installation in accordance with the present invention.

Referring now to the drawing, reference numeral 1 designates therein the transmission housing of any suitable change-speed-gear construction in which is arranged a spool-type sliding control valve member 2 forming part of any conventional automatic shifting control system which controls the flow of a pressure fluid medium under pressure transmitting the shifting forces for the automatically shifted change-speed transmission into the channels 3, 3' and 3''. The control member 2 is adapted to be displaced into the different shifting positions I, II and III thereof corresponding to the three transmission ratios or speeds to be engaged in the transmission by means of a centrifugal governor 4 which may be driven, for example, by the transmission output shaft (not shown) or a shaft operatively connected therewith. Thus, as the control slide valve member 2 is adjusted by centrifugal governor 4 into any one of the three positions I, II and III thereof, the pressure medium is conducted, in a manner known per se, into the three different channels 3, 3', and 3'' depending on the position or rotational speed of the centrifugal governor 4. The control member 2 and the centrifugal governor 4 are connected with each other by a connecting part 5. This connecting part 5 extends beyond the control member 2 and carries at the end thereof a projection or extension 5' which engages into a cut-out portion or recess 6 of, for example, a gravity-operated pawl or dog member 7 though any suitable spring-loading such as the spring indicated in broken lines at 7'' may also be used to displace the pawl or dog 7 to the normal rest position thereof. The pawl member 7 is pivotally supported at one end thereof at the transmission housing 1 and is adapted to abut with the pivotal end 7' thereof against an abutment 1' provided at the transmission housing 1. This second, free end 7' may be retained in the position thereof in which it abuts against the abutment 1' by means of an intermediate lever 8 actuated by an electromagnet 9 of suitable construction. The electromagnet 9 for that purpose may be energized through an energizing circuit which is adapted to be closed by means of a switch 10 operated by the driver whereby a warning light 11 to indicate this shifting position is interconnected into the energizing circuit for the electromagnet 9.

The cut-out portion 6 of the pawl member 7 into which engages the extension 5' of the part 5 is so constructed that with a de-energized electromagnet 9 the extension 5' abuts against the rectilinear boundary line 12 defining one side of the cut-out portion 6. The length of the cut-out portion 6 for the pawl member 7 corresponds to the shifting path of the control member 2 whereas the width thereof is larger, from one end thereof over a portion of its length, than the corresponding dimension of the extension 5' at the connecting part 5 by an amount corresponding to the pivotal shifting path of the pawl member 7. This range is terminated by a shoulder 13 which reduces the width of the cut-out portion 6 approximately by the shifting path of the pawl member 7. The width of the cut-out portion 6 thereby decreases constantly from this shoulder 13 under a small angle 14 of approximately between 5° to 15° up to the right-hand end of the cut-out portion 6 as viewed in the drawing. At this right-hand end of the cut-out portion, as viewed in the drawing, the width of the cut-out portion 6 corresponds approximately to the dimension of the extension 5'.

If the electromagnet 9 is de-energized, then the pawl member 7 may be lifted off or may move away from the abutment 1' at the transmission housing 1 whereby the rectilinear boundary line 12 of the cut-out portion 6 abuts against the extension 5'. The extension 5', in that case, is freely movable over the entire length of the cut-out portion 6 of the pawl member 7 so that the control member 2 is adapted to be adjusted unimpededly by the centrifugal governor 4. If the electromagnet 9 is energized by closing of switch 10, then the end 7' of the pawl member 7 is brought into abutment against the abutment 1' at the transmission housing 1 whereby there occurs also a change in the position of the cut-out portion 6 with respect to the extension 5'. The ability on the part of the extension 5' to move freely is now limited by the shoulder 13 to only a portion of the length of the cut-out portion 6. Since the effective abutments for the extension 5' which have now become operative namely, on the one hand, the left-hand end of the cut-out portion 6 as viewed in the drawing and, on the other, the shoulder 13 thereof corresponds to the positions I and II of the control member 2 for first and second speed or transmission ratio, respectively, of the automatically-shifted change-speed transmission, the shifting operation of the transmission is limited thereby to a change between first and second speeds or transmission ratios.

If the extension 5', during closure of the switch 10, is located within the narrowed region of the cut-out portions 6, i.e. if the pawl member 7 is brought into the blocking position while the third speed or transmission ratio III is engaged, then the pawl member 7 abuts with the boundary line 14' thereof forming the angle 14 against the extension 5'. As the rotational speed of the transmission output shaft decreases, and therewith as the speed of the centrifugal governor 4 decreases, the extension 5' slides along the boundary line 14' until the shoulder 13 is reached and the pawl member 7 is thereby given the possibility to abut against the abutment 1' at the transmission housing 1. The further movement of the extension 5' is thereupon restricted to the first and second transmission ratios or speeds I and II and any undesired shifting into the third transmission ratio or speed III is effectively prevented from now on.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. An arrangement for selectively limiting the shifting operation of an automatically-shifted change-speed transmission, comprising control means having an adjusting member for controlling the shifting operation of said transmission, and blocking means operatively connected with said control means and having two shifting positions for selectively limiting in one of said positions the automatic shifting operation of said transmission to a range of speeds thereof smaller than the full range, said blocking means comprising a pivoted member provided with a cut-out portion and means carried by said adjusting member engaging in said cut-out portion.

2. An arrangement for selectively limiting the shifting operation of an automatically shifted change-speed transmission according to claim 1, wherein said blocking means includes means enabling movement of said control means from a position thereof within the range of speeds blocked by said blocking means into a position within the range of speeds unaffected by said blocking means.

3. An arrangement for selectively limiting the shifting operation of an automatically-shifted change-speed transmission, comprising control means including an adjusting member for controlling the shifting operation of said transmission and blocking means operatively connected with said control means and having two shifting positions, said blocking means enabling essentially unimpeded movement of said control means in one of said positions while limiting the movement thereof to a predetermined range in the other position thereof, said blocking means including a pawl member provided with a cut-out portion, said adjusting member including an extension engaging into said cut-out portion, the length of said cut-out portion corresponding to the normal movement of said adjusting member, and the width of said cut-out portion changing over said length.

4. An arrangement for selectively limiting the shifting operation of an automatically-shifted change-speed transmission according to claim 3, wherein said pawl member has a normal shifting path, and wherein the width of said cut-out portion is larger than the width of said extension over a portion of the length thereof by an amount at least approximately equal to said shifting path.

5. An arrangement for selectively limiting the shifting operation of an automatically shifted change-speed transmission according to claim 4, wherein the cut-out portion of said pawl member is reduced over the other portion of the length thereof by a shoulder to approximately the width of said extension.

6. An arrangement for selectively limiting the shifting operation of an automatically shifted change-speed transmission according to claim 5, wherein the boundary line defining said cut-out portion extends within the narrowed region thereof corresponding to said other portion, from said shoulder, at a slight angle which constantly reduces the width of said cut-out portion.

7. An arrangement for selectively limiting the shifting operation of an automatically shifted change-speed transmission according to claim 6, wherein said angle is approximately between five to fifteen degrees.

8. An arrangement for selectively limiting the shifting operation of an automatically shifted change-speed transmission according to claim 6, wherein said pawl member is pivotally secured at one end thereof on the transmission housing, and selectively actuatable shifting means for adjusting the free end of said pawl member into the different shifting positions thereof.

9. An arrangement for selectively limiting the shifting operation of an automatically shifted change-speed transmission according to claim 8, wherein said transmission housing includes an abutment, said selectively actuatable means including electromagnetic means adapted to be selectively energized by the driver, and means operatively connecting said electromagnetic means with said free end of said pawl member to urge the free end of said pawl member against said abutment upon energization of said electromagnetic means.

10. An arrangement for selectively limiting the shifting operation of an automatically shifted change-speed transmission according to claim 9, wherein said electromagnetic means includes an energizing circuit, and a warning light in said circuit to indicate the shifting position of the transmission corresponding to the energized condition of said electromagnetic means.

11. An arrangement for selectively limiting the shifting operation of an automatically shifted change-speed transmission according to claim 10, wherein said cut-out portion is provided with an essentially rectilinear side defining the width of said cut-out portion and corresponding to the guide surface during normal operation of the transmission, and wherein said extention rests against said rectilinear surface during normal operation, and spring means for retaining said electromagnet in the normal de-energized condition thereof.

12. An arrangement for selectively limiting the shifting operation of an automatically shifted change-speed transmission according to claim 1, wherein said cut-out portion is provided with a first portion having a predetermined width and a second portion of width smaller than said predetermined width, and wherein the boundary line defining the width of said cut-out portion in said second narrower portion forms an angle with the longitudinal direction thereof of approximately five to fifteen degrees whereby the width of said second portion decreases constantly toward the end thereof.

13. An arrangement for selectively limiting the shifting operation of an automatically shifted change-speed transmission according to claim 3, wherein said pawl member is pivotally secured at the transmission housing at one end thereof, and driver influenced means for moving the other end of said pawl member into the different shifting positions thereof.

14. An arrangement for selectively limiting the shifting operation of an automatically shifted change-speed transmission according to claim 13, wherein the transmission housing is provided with an abutment, and wherein said driver influenced means includes an electromagnet having an energizing circuit, a switch in said energizing circuit adapted to be selectively closed by the driver for energizing said electromagnet, means operatively connecting said electromagnet with the free end of said pawl member to move the same against said abutment upon closure of said switch, and indicating means in said circuit for indicating the closure of said switch and therewith the energization of said electromagnet.

15. An arrangement for selectively limiting the shifting operation of an automatically shifted change-speed transmission according to claim 14, wherein said cut-out portion is provided with one side of essentially rectilinear configuration corresponding to the abutment surface for said extension during normal operation, and means for urging said electromagnet and said connecting means into the normal rest position thereof corresponding to the de-energized condition of said electromagnet.

16. An arrangement for selectively limiting the shifting operation of an automatically shifted change-speed transmission, comprising control means for automatically controlling the shifting operation of said transmission in all speeds thereof including adjusting means normally operative to move over a predetermined full range, and lock-out means operatively connected with said adjusting means for restricting movement of said adjusting means to a limited range smaller than said full range to thereby lock-out automatic engagement of at least one of said speeds, said lockout means comprising a plurality of abutment means defining said ranges.

17. An arrangement for selectively limiting the shifting operation of an automatically shifted change-speed transmission according to claim 16, wherein said lock-out means is operative to enable movement of said adjusting means from a position within the locked-out range into a position within said limited range upon actuation of said lock-out means.

18. An arrangement for selectively limiting the shifting operation of an automatically shifted change-speed transmission according to claim 16, wherein said adjusting means is physically actuated during each shifting operation, and wherein said lock-out means precludes physical movement of said adjusting means.

19. An arrangement for selectively limiting the shifting operation of an automatically shifted change-speed transmission according to claim 18, wherein said control means includes speed responsive means for controlling the movement of said adjusting means.

References Cited in the file of this patent

UNITED STATES PATENTS

| | | |
|---|---|---|
| 2,594,811 | Schjolin | Apr. 29, 1952 |
| 2,730,909 | Svoboda et al. | Jan. 17, 1956 |